US006896418B1

(12) United States Patent
Bradford et al.

(10) Patent No.: US 6,896,418 B1
(45) Date of Patent: May 24, 2005

(54) PLANAR POLISHING FIXTURE

(75) Inventors: Jackie Ray Bradford, Hollister, CA (US); John Bryan Russell, San Jose, CA (US)

(73) Assignee: Realm Communications Group, Inc., Milpitas, CA (US)

( * ) Notice: Subject to any disclaimer, the term of this patent is extended or adjusted under 35 U.S.C. 154(b) by 109 days.

(21) Appl. No.: 10/177,988

(22) Filed: Jun. 21, 2002

(51) Int. Cl.[7] ............................................. G02B 6/36
(52) U.S. Cl. ........................ 385/85; 385/53; 385/81
(58) Field of Search .......................... 385/85, 226, 53, 385/64, 81, 82, 84, 135–137, 147; 451/365, 278; 51/283

(56) References Cited

U.S. PATENT DOCUMENTS

| | | | | | |
|---|---|---|---|---|---|
| 3,285,551 | A | * | 11/1966 | Tschanz | ........................ 248/56 |
| 4,679,895 | A | * | 7/1987 | Huber | ........................... 385/87 |
| 4,693,035 | A | * | 9/1987 | Doyle | ........................ 451/278 |
| 4,763,978 | A | * | 8/1988 | Courtney-Pratt et al. | ...... 385/47 |
| 4,964,685 | A | * | 10/1990 | Savitsky et al. | ............... 385/58 |
| 5,184,433 | A | * | 2/1993 | Maack | ........................ 451/41 |
| 5,559,916 | A | * | 9/1996 | Terao et al. | ................... 385/85 |
| 5,640,475 | A | * | 6/1997 | Takahashi | ..................... 385/85 |
| 5,720,653 | A | * | 2/1998 | Miller et al. | ................. 451/278 |

* cited by examiner

*Primary Examiner*—Kurch Kianni
*Assistant Examiner*—Christopher M. Kalivoda
(74) *Attorney, Agent, or Firm*—Sawyer Law Group LLP

(57) ABSTRACT

A method and apparatus for securing a workpiece during a polishing operation are described. More particularly, embodiments of the present invention provide a support fixture for securing a workpiece. The support fixture includes a gripping member that is configured to grip a workpiece and configured to release the workpiece. The support fixture also includes a ferrule that is configured to tighten the gripping member around the workpiece and configured to release the gripping member from the workpiece.

31 Claims, 4 Drawing Sheets

PLANAR POLISHING FIXTURE

FIELD OF THE INVENTION

The present invention relates to polishing fixtures, and more particularly to a method and system for securing a workpiece during a polishing operation.

BACKGROUND OF THE INVENTION

Planar polishing fixtures hold workpieces during polishing operations. Such workpieces can be configured to hold a single or multiple optical fibers.

Before the optical fibers are connected, they are typically treated, e.g., polished, for a better optical connection. A planar polishing fixture can be used in conjunction with a polisher or lapper to treat the end faces of the optical fibers.

FIG. 1 is a side view of a conventional planar polishing fixture 10 in which a workpiece 12, or connector, can be secured. The workpiece 12 holds, or ""terminates,"" one or more optical fibers 14. The planar polishing fixture 10 includes a base 16 and a clamp 18, both of which are sized according to the size of the workpiece 12. A screw 20 secures the clamp 18 to the base 16 thereby securing the workpiece 12 within the planar polishing fixture 10.

FIG. 2 is a top view of the planar polishing fixture 10 of FIG. 1. For ease of illustration, the clamp is not shown in FIG. 2.

In operation, the workpiece 12 is inserted into the planar polishing fixture 10. Then a polisher (not shown) polishes the end faces of the optical fibers 14. The lengths of the optical fibers 14 should comply with geometric and surface requirements so that when the workpiece 12 mates with another connector, all of the ends of the corresponding optical fibers make contact with minimal optical loss. When the lengths do not meet geometric and surface requirements, however, optical losses are incurred.

A problem with the conventional planar polishing fixture 10 is that it does not reliably enable the optical fibers to be polished such that geometric and surface requirements are met. The optical fiber end faces might appear to be properly polished while in the planar polishing fixture 10, but the optical fiber end faces do not meet geometric and surface requirements when taken out of the planar polishing fixture 10. As a result, not all of the optical fibers 14 will make contact with their corresponding optical fibers end faces when the workpiece 12 mates with another connector.

One cause of this problem is that the workpiece 12 can be out of tolerance. That is, the workpiece 12 can have irregularities on its surface. For example, the workpiece 12 can become deformed by the clamping force. In addition, any irregularities in the workpiece 12 can cause it to be inadequately supported by the planar polishing fixture 10. As a result, the workpiece 12 can distort within the planar polishing fixture 10, thereby causing the optical fibers 14 to not meet geometric and surface requirements. Precision in fiber optic processes is critical because optical fiber core diameters are so small. For example, the core of a single optical fiber is about 8.3 microns in diameter. Accordingly, a small mismatch in an optical fiber is problematic.

Accordingly, what is needed is a method and system for reliably securing a connector during a polishing operation. The system and method should be able to secure a connector during a polishing procedure so that any optical fibers being held by the connector are polished so that the optical fiber end faces meet geometric and surface requirements. The present invention addresses such a need.

SUMMARY OF THE INVENTION

The present invention achieves the above needs and others with a method and system for securing one or more workpieces during a polishing operation. More particularly, embodiments of the present invention provide a support fixture for securing the one or more workpieces, each workpiece holding one or more fiber optic termini. The support fixture includes a gripping member that is configured to grip the workpiece evenly 360 degrees around the workpiece. The support fixture also includes a ferrule that is configured to tighten the gripping member around the workpiece and configured to release the gripping member from the workpiece.

Consequently, any optical fibers being held by the workpiece are polished so that the optical fiber end faces meet geometric and surface requirements.

DETAILED DESCRIPTION

The present invention relates to polishing fixtures, and more particularly to a method and system for securing a connector during a polishing operation. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
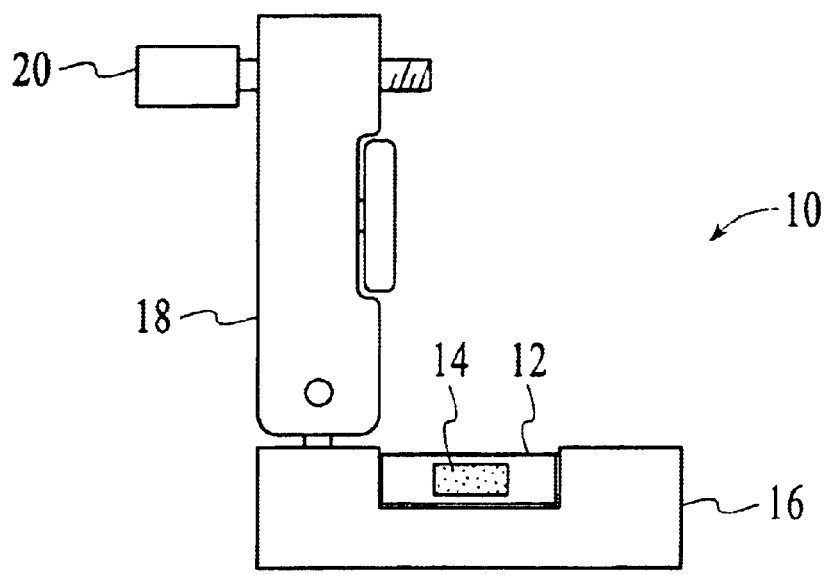
FIG. 1 is a side view of a conventional planar polishing fixture.
Figure 2:
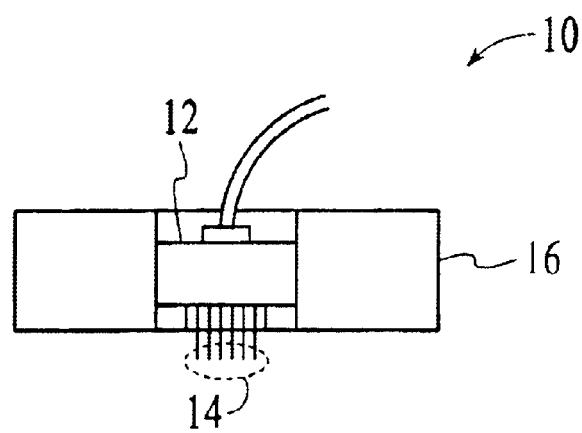
FIG. 2 is a top view of the planar polishing fixture 10 of FIG. 1.
Figure 3:
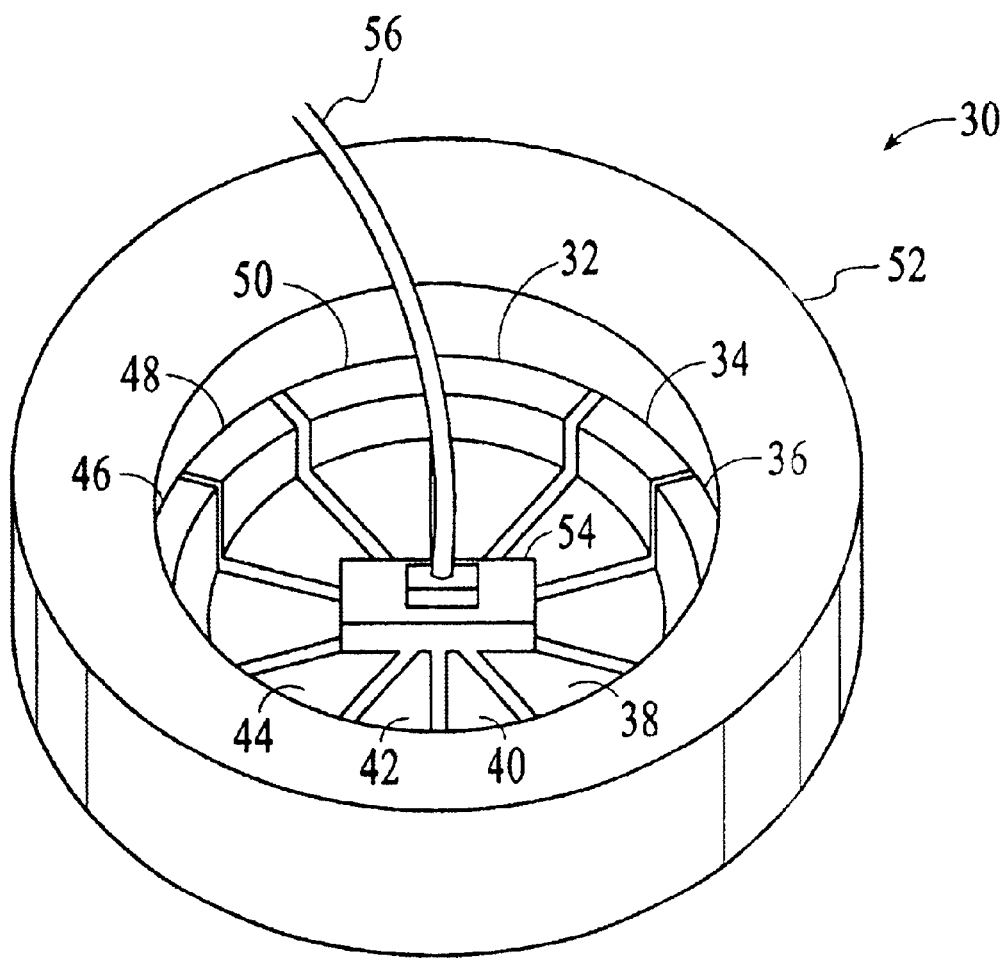
FIG. 3 is a perspective view of a support fixture in accordance with the present invention.

Generally, embodiments of the present invention provide a support fixture for securing a connector. The support fixture includes a plurality of support members, each of which engages the connector thereby reliably securing the connector during a polishing operation. FIG. 3 describes an embodiment of the present invention.

FIG. 3 is a perspective view of a support fixture 30 in accordance with the present invention. The support fixture 30 has a plurality of support members 32, 34, 36, 38, 40, 42, 44, 46, 48, and 50, which moveably connect to a ferrule 52. The support members 32–50 are arranged to form an aperture, in which a connector ferrule 54 (hereinafter referred to as connector 54) can be secured. The number of support members is not limited to eight. The exact number of support members can vary and will depend on the specific"

application. For example, there can be as few as two support members. Also, there can be more than eight support members.

The actual number of support members will vary and will depend on the specific application. For example, in this specific embodiment, there are eight support members. In another embodiment, there can be two support members. There can also be up to and beyond eight support members, depending on the configuration, e.g., size, shape, etc., of the connector.

The actual shape of the support members will vary and will depend on the specific application. For example, in this specific embodiment, the support members are substantially triangular. They can also be other shapes such as substantially rectangular.

The support fixture 30 can secure different types of connectors. In this specific embodiment, the connector 54 is connected to a plurality of optical fibers (not shown). In this specific embodiment, the optical fibers are enclosed in a protective jacket 56. The optical fibers are exposed on the underside of the support fixture 30.

The support fixture 30 is versatile and can be used with different types of machines and processes. For example, the support fixture 30 can be used with lapping machines, polishing machines, and as well as with other kinds of machines, adaptable to current and future machines.

Figure 4:
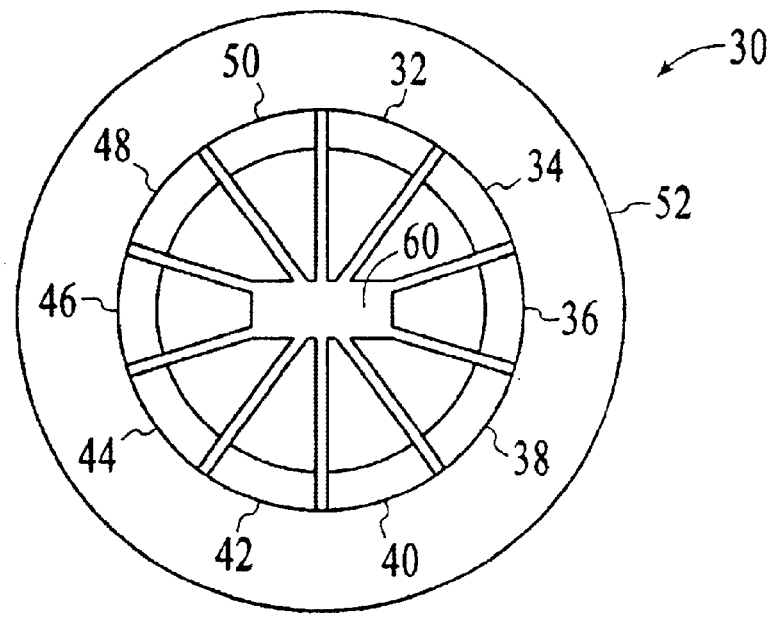
FIG. 4 is a top view of the support fixture of FIG. 3 in accordance with the present invention.

FIG. 4 is a top view of the support fixture 30 of FIG. 3 in accordance with the present invention. For ease of illustration, the support fixture 30 is shown without a connector in order to show an aperture 60.

Figure 5A:
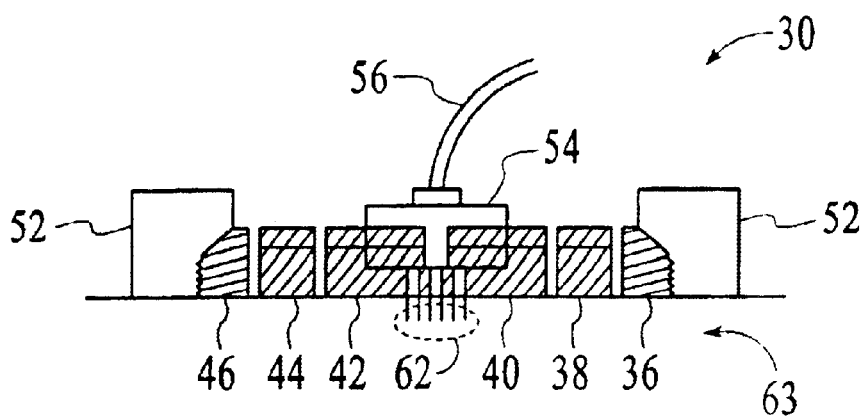
FIG. 5A is a side view of the support fixture of FIG. 3 in accordance with the present invention.

FIG. 5A is a side view of the support fixture 30 of FIG. 3 in accordance with the present invention. The support fixture 30 is shown with the connector 54 in order to show a plurality of optical fibers 62, which are exposed. Also shown is a base 63.

In one embodiment, the optical fiber end faces can be perpendicular to the surface of the base. In another embodiment, the optical fiber end faces can be angled relative to the surface of the base. The specific embodiment used will depend on the specific application.

Figure 5B:
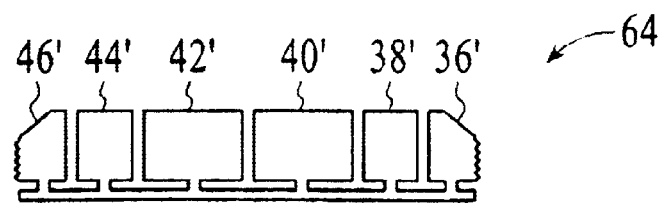
FIG. 5B is a side view of a gripping member in accordance with another embodiment of the present invention.

In operation, referring to both FIGS. 4, 5A, and 5B, the connector 54 is inserted into the aperture 60 of the support fixture 30. Pressure is applied to the support members 32–50 to actuate them to close and open the aperture. The ferrule 52 as described below can apply the pressure. Other means of actuation, e.g., a clamp, a lever, etc., can apply the pressure.

In this specific embodiment, the ferrule 52 is a nut having threads on its interior. The treads engage with corresponding threads on the support members 32–50. If the ferrule 52 is turned in one direction, e.g., clockwise, the aperture 60 closes. As shown in FIGS. 5A and 5B, in this specific embodiment, the outside of the support members 32–50 are tapered and meet the inside of the ferrule 52, which is tapered. As the ferrule 52 is turned, e.g., clockwise, such that it moves toward the support members 32–50, the tapered portion of the ferrule 52 exerts an inward force against the support members 32–50 causing the aperture 60 to contract. As the aperture 60 closes, opposing forces provided by the support members 32–50 secures the connector 54. If the ferrule 52 is turned in the other direction, e.g., counterclockwise, the aperture 60 opens. The specific directions in which the ferrule is turned to either close or open the aperture 60 will depend on the configuration of the threads, which of course will depend on the specific application. The turning of the ferrule 52 can be automated or controlled manually.

In another embodiment, the threads can be on the exterior of the ferrule 52. In such an embodiment, the threads of the ferrule 52 engage with corresponding threads in the base 63.

The connector 54 is reliably secure when the aperture 60 closes because all of the support members 32–50 make contact with the connector 54 and are tightened by the ferrule 52. Furthermore, the connector 54 is supported at multiple locations; i.e., the support fixture 30 grips the connector 54 around it, 360 degrees. Furthermore, the forces applied by the support members 32–50 onto the connector 54 are distributed evenly.

Once the connector 54 is secured in the support fixture 30, a polisher (not shown) polishes the ends of the optical fibers 62. Because the connector is well secured, the optical fiber end faces can be polished to meet geometric and surface requirements. As a result, when the connector 54 is removed from the support fixture 30 to be mated with another connector, all of the ends of corresponding optical fibers will make contact.

FIG. 5B is a side view of a gripping member 64 in accordance with another embodiment of the present invention. In this specific embodiment, the gripping member 64 includes support members 32', 34', 36', 38', 40', 42', 44', 46', 48', and 50', which are formed as one piece. While the support members are integrally connected as one gripping member, they can be flexed inwardly and outwardly to cause the aperture to close and open. In this specific embodiment, the support members 32'–50' are spring biased such that they move inwardly when a force is exerted against them by the ferrule and they move outwardly when the force is removed.

In another embodiment, the gripping member can be elastomeric.

Figure 6:
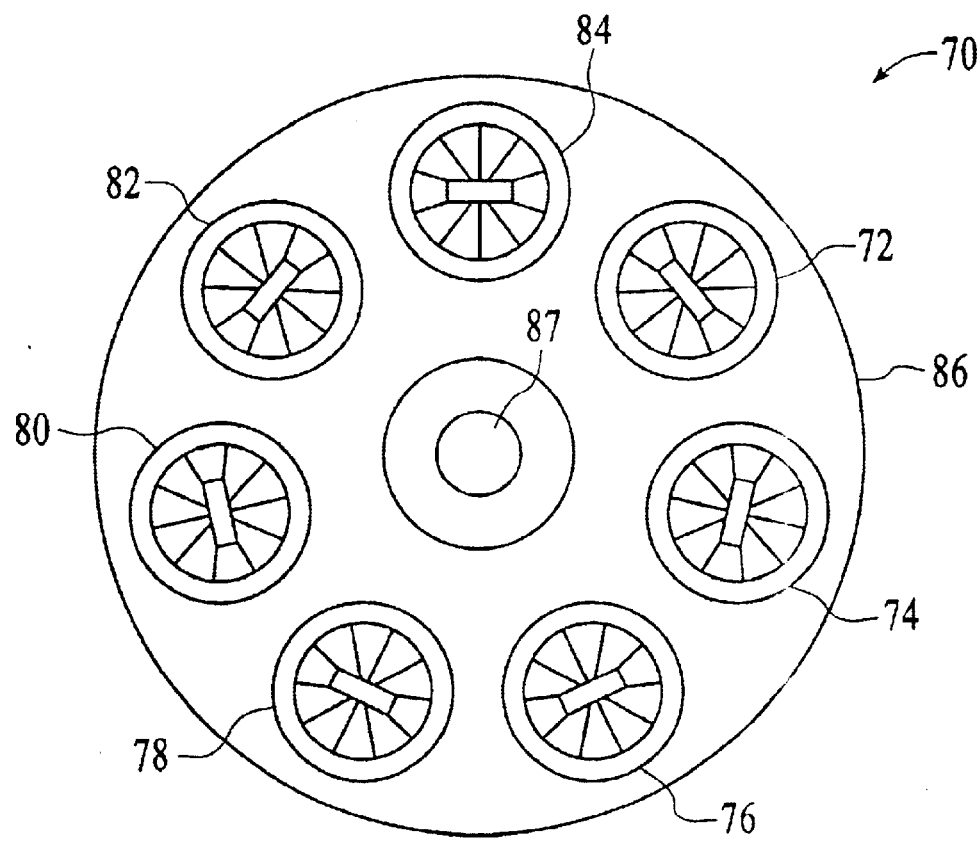
FIG. 6 is a top view of a support assembly including a plurality of support fixtures assembled on a platform in accordance with the present invention.

FIG. 6 is a top view of a support assembly 70 including a plurality of support fixtures 72, 74, 76, 78, 80, 82, and 84 assembled on a platform 86 in accordance with the present invention. The platform 86 is universal. As such, the platform 86 can be used with different types of machines and processes. For example, the universal platform 86 can be used with lapping machines, polishing machines, and as well as with others types of machines. In this specific embodiment, the platform 86 is a hub, which has an opening 87 that can receive an axle (not shown). Each of the support fixtures 72–84 is similar to the support fixture 30 of FIG. 3. The number of support fixtures can vary, depending on the application. For example, there can be as few as one support fixture. There can also be up to and beyond seven support fixtures.

Figure 7:
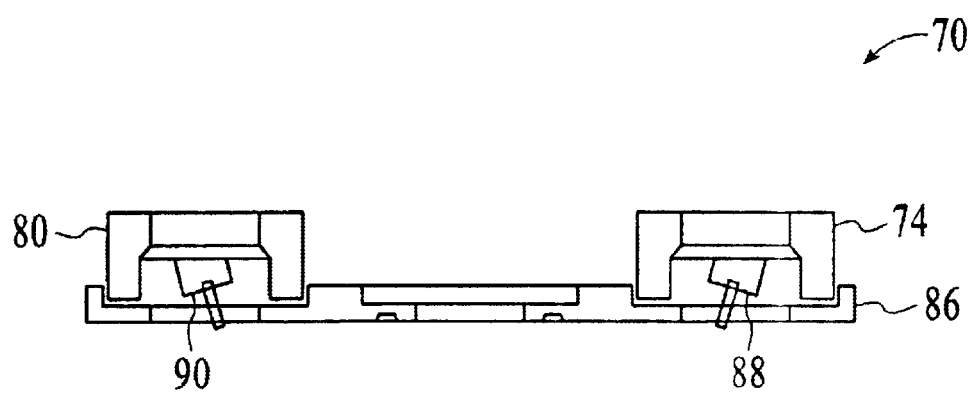
FIG. 7 is a side view of the support assembly of FIG. 6 in accordance with the present invention.

FIG. 7 is a side view of the support assembly 70 of FIG. 6 in accordance with the present invention. For simplification, only two support fixtures 74 and 80 are shown. This embodiment includes support inserts 88 and 90.

According to the method and system disclosed herein, embodiments of the present invention provide numerous benefits. For example, they reliably secure connectors so that optical fibers held by the connectors can be polished to meet geometric and surface requirements. Furthermore, a support fixture in accordance with the invention can be tightened to better secure a connector. Furthermore, the support fixture compensates for deviations in connector dimensions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A support fixture for securing a workpiece, the support fixture comprising:
    a gripping member configured to grip the workpiece 360 degrees around the workpiece and configured to release the workpiece, wherein the gripping member comprises a plurality of support members; and
    a ferrule moveably coupled to the gripping member, the ferrule being configured to tighten the gripping member around the workpiece and configured to release the gripping member from the workpiece, wherein the ferrule comprises a tapered portion, wherein the tapered portion is configured to move the plurality of support members inwardly and outwardly;
    and wherein the workpiece is a connector ferrule.

2. The support fixture of claim 1 wherein the plurality of support members are integrally connected.

3. The support fixture of claim 1 wherein the connector ferrule holds one or more optical fibers, the one or more optical fibers having end faces, wherein the end faces of the one or more optical fibers can be polished to comply with geometric and surface requirements.

4. The support fixture of claim 1 wherein the gripping member is elastomeric.

5. The support fixture of claim 1 wherein the support fixture is used in a polishing procedure.

6. The support fixture of claim 1 wherein the support fixture is used in a lapping procedure.

7. A support assembly for securing one or more workpieces, the support assembly comprising:
    a universal hub;
    a gripping member configured to grip a workpiece 360 degrees around the workpiece and configured to release the workpiece, wherein the gripping member comprises a plurality of support members; and
    a ferrule moveably coupled to the gripping member, the ferrule being configured to tighten the gripping member around workpiece and configured to release the gripping member from the workpiece, wherein the ferrule comprises a tapered portion, wherein the tapered portion is configured to move the plurality of support members inwardly and outwardly;
    and wherein the workpiece is a connector ferrule.

8. The support assembly of claim 7 wherein the connector ferrule holds one or more optical fibers, the one or more optical fibers having end faces, wherein the end faces of the optical fibers can be polished to comply with geometric and surface requirements.

9. The support assembly of claim 7 wherein the support fixture is used in a polishing procedure.

10. The support assembly of claim 7 wherein the support fixture is used in a lapping procedure.

11. A support fixture for securing a workpiece, the support fixture comprising:
    a plurality of support members configured to move towards the workpiece to contact and to secure the workpiece and configured to move away from the workpiece to release the workpiece; and
    a ferrule moveably coupled to the plurality of support members, wherein the ferrule comprises a tapered portion, wherein the tapered portion is configured to move the plurality of support members inwardly and outwardly;
    and wherein the workpiece is a connector ferrule.

12. The support fixture of claim 11 wherein the connector ferrule holds one or more optical fibers, the one or more optical fibers having end faces, wherein the end faces of the optical fibers can be polished to comply with geometric and surface requirements.

13. The support fixture of claim 11 wherein each support member of the plurality of support members applies a force against the connector ferrule, each force having an opposing force to secure the connector ferrule.

14. The support fixture of claim 13 wherein the ferrule varies the force of each support member of the plurality of support members.

15. The support fixture of claim 11 wherein the plurality of support members comprises three or more support members.

16. The support fixture of claim 11 wherein the plurality of support members comprises at least 8 support members.

17. The support fixture of claim 11 wherein the support fixture is used in a polishing procedure.

18. The support fixture of claim 11 wherein the support fixture is used in a lapping procedure.

19. A support assembly for securing one or more workpieces, the support assembly comprising:
    a universal hub;
    a plurality of support fixtures that are supported by the universal hub, each support fixture of the plurality of support fixtures including:
        a gripping member configured to grip a workpiece 360 degrees around the workpiece, wherein the gripping member comprises a plurality of support members, the plurality of support members being configured to move towards the workpiece to contact and to secure the workpiece and configured to move away from the workpiece to release the workpiece; and
        a ferrule moveably coupled to the plurality of support members, wherein the ferrule comprises a tapered portion, wherein the tapered portion is configured to move the plurality of support members inwardly and outwardly,
    and wherein the workpiece is a connector ferrule.

20. The support assembly of claim 19 wherein the connector ferrule holds one or more optical fibers, the one or more optical fibers having end faces, wherein the end faces of the optical fibers can be polished to comply with geometric and surface requirements.

21. The support assembly of claim 19 wherein each support member of the plurality of support members applies a force against the connector ferrule, each force having an opposing force to secure the connector ferrule.

22. The support assembly of claim 19 wherein the ferrule varies the force of each support member of the plurality of support members.

23. The support assembly of claim 19 wherein the support assembly is used in a polishing procedure.

24. The support assembly of claim 19 wherein the support assembly is used in a lapping procedure.

25. A method for securing a workpiece, the method comprising the steps of:
    (a) providing a plurality of support members;
    (b) providing a ferrule, wherein the ferrule comprises a tapered portion, wherein the tapered portion is configured to move the plurality of support members inwardly and outwardly; and
    (c) moving the plurality of support members towards the workpiece to contact and to secure to the workpiece;
    and wherein the workpiece is a connector ferrule.

26. The method of claim 25 further comprising the step of (d) moving the plurality of support members away from the workpiece to release the connector ferrule.

27. The method of claim 25 further comprising the step of (d) polishing one or more optical fibers terminated by the connector ferrule.

28. The method of claim 25 further comprising the step of (d) lapping one or more optical fibers terminated by the connector ferrule.

29. The method of claim 25 wherein the moving step (c) further comprises the step of (c1) controlling the movement of each support member with a ferrule.

30. A support assembly for securing optical fiber connectors, the support assembly comprising:

a universal hub; and a plurality of support fixtures that are supported by the universal hub, wherein the plurality of support fixtures includes at least 2 support fixtures, each support fixture including:

a gripping member configured to grip an optical fiber connector 360 degrees around the connector ferrule, wherein the gripping member comprises a plurality of support members, wherein the plurality of support members includes at least 2 support members, the plurality of support members being configured to move towards the optical fiber connector to contact and to secure the optical fiber connector and configured to move away from the optical fiber connector to release the optical fiber connector, wherein each support member of the plurality of support members applies a force against the optical fiber connector, each force having an opposing force to secure the optical fiber connector; and a ferrule moveably coupled to the plurality of support members, wherein the ferrule comprises a tapered portion, wherein the tapered portion is configured to move the plurality of support members inwardly and outwardly, wherein the ferrule varies the force of each support member of the plurality of support members.

31. A support fixture for securing a connector ferrule, the support fixture comprising:

a gripping member configured to grip the connector ferrule 360 degrees around the workpiece and configured to release the connector ferrule, wherein the gripping member comprises a plurality of support members; and a ferrule moveably coupled to the gripping member, the ferrule being configured to tighten the gripping member around the connector ferrule and configured to release the gripping member from the connector ferrule, wherein the ferrule comprises a tapered portion, wherein the tapered portion is configured to move the plurality of support members inwardly and outwardly, wherein the connector ferrule is a optical fiber connector, wherein the connector ferrule holds one or more optical fibers, the one or more optical fibers having end faces, and wherein the end faces of the one or more optical fibers can be polished to comply with geometric and surface requirements.

\* \* \* \* \*